United States Patent [19]

Siedle et al.

[11] Patent Number: 5,853,642

[45] Date of Patent: Dec. 29, 1998

[54] PROCESS FOR THE IN-LINE POLYMERIZATION OF OLEFINIC MONOMERS

[75] Inventors: Allen R. Siedle, Lake Elmo; Gaddam N. Babu, Woodbury; Katherine A. Brown-Wensley, Lake Elmo; James R. Peterson, St. Paul, all of Minn.

[73] Assignee: Minnesota Mining and Manufacturing Company, St. Paul, Minn.

[21] Appl. No.: 281,733

[22] Filed: Jul. 29, 1994

[51] Int. Cl.$^6$ .................................................. B29C 71/00
[52] U.S. Cl. .............................. 264/236; 264/83; 264/85; 264/331.17; 264/347; 526/170; 526/171
[58] Field of Search .............................. 526/159; 264/83, 264/85, 236, 331.17, 347

[56] References Cited

U.S. PATENT DOCUMENTS

| | | | |
|---|---|---|---|
| 2,519,983 | 8/1950 | Simons | 204/62 |
| 2,532,011 | 11/1950 | Dahlquist et al. | 154/53.5 |
| 2,803,656 | 8/1957 | Ahlbrecht et al. | 260/556 |
| 3,476,753 | 11/1969 | Hansen | 260/247.1 |
| 3,542,717 | 11/1970 | Lipman | 260/27 |
| 3,546,183 | 12/1970 | Vergne et al. | 260/78.4 |
| 3,635,755 | 1/1972 | Balinth et al. | 117/122 P |
| 3,734,962 | 5/1973 | Niederprum et al. | 260/556 F |
| 3,926,717 | 12/1975 | Marchessault et al. | 162/157 C |
| 3,954,697 | 5/1976 | McConnell et al. | 526/350 |
| 3,957,724 | 5/1976 | Schurb et al. | 260/46.5 E |
| 4,072,813 | 2/1978 | McConnell et al. | 526/348.2 |
| 4,178,272 | 12/1979 | Meyer, Jr. et al. | 260/27 R |
| 4,181,752 | 1/1980 | Martens et al. | 427/54.1 |
| 4,250,063 | 2/1981 | Kotani et al. | 260/4 |
| 4,259,470 | 3/1981 | Trotter et al. | 526/348.2 |
| 4,288,358 | 9/1981 | Trotter et al. | 260/31.8 M |
| 4,311,810 | 1/1982 | Fujii et al. | 525/321 |
| 4,329,384 | 5/1982 | Vesley et al. | 428/40 |
| 4,386,135 | 5/1983 | Campbell et al. | 428/447 |
| 4,416,950 | 11/1983 | Muller et al. | 428/537 |
| 4,826,939 | 5/1989 | Stuart, Jr. | 526/348.5 |
| 4,923,936 | 5/1990 | Goodall et al. | 526/115 |
| 4,923,943 | 5/1990 | Hara et al. | 526/283 |
| 4,943,621 | 7/1990 | Janda et al. | 526/127 |
| 4,945,144 | 7/1990 | Grubbs et al. | 526/268 |
| 4,994,535 | 2/1991 | Endo et al. | 526/259 |
| 5,011,730 | 4/1991 | Tenney et al. | 428/209 |
| 5,112,882 | 5/1992 | Babu et al. | 522/158 |
| 5,194,189 | 3/1993 | Papastavros et al. | 264/63 |
| 5,194,501 | 3/1993 | Babu et al. | 525/103 |
| 5,198,511 | 3/1993 | Brown-Wensley et al. | 526/113 |
| 5,202,361 | 4/1993 | Zimmerman et al. | 522/103 |
| 5,209,971 | 5/1993 | Babu et al. | 428/343 |
| 5,294,668 | 3/1994 | Babu | 525/80 |
| 5,296,433 | 3/1994 | Siedle et al. | 502/117 |
| 5,296,566 | 3/1994 | Brown-Wensley et al. | 526/171 |
| 5,354,619 | 10/1994 | Babu | 428/462 |
| 5,491,206 | 2/1996 | Brown Wensley et al. | 526/126 |

FOREIGN PATENT DOCUMENTS

| | | | |
|---|---|---|---|
| 0 003 194 | 7/1979 | European Pat. Off. | C09J 3/14 |
| 0 147 035 | 7/1985 | European Pat. Off. | D21H 3/02 |
| 59-157106 | 9/1984 | Japan | C08F 297/08 |
| 61-296036 | 12/1986 | Japan | B32B 15/08 |
| WO 92/07916 | 5/1992 | WIPO | C09J 123/18 |

OTHER PUBLICATIONS

Technical Bulletin No. AL–143, "Handling Air–Sensitive Reagents," Aldrich Chemical Company, Inc. (1983).
"Films, Multilayer," *Encyclopedia of Polymer Science and Engineering*, vol. 7, pp. 116–118, John Wiley & Sons, Inc. (1987).
"Metathesis Polymerization," *Encyclopedia of Polymer Science and Engineering*, vol. 9, pp. 634–644, John Wiley & Sons, Inc. (1987).
Boor, J. Jr., "Polymerization of Monomers," *Ziegler–Natta Catalysts and Polymerizations*, Ch. 19, pp. 512–562, Academic Press (1979).
Ciardelli, F. et al., "From Heterogeneous to Homogeneous Catalysis in Monoalkene Polymerization," *Comprehensive Polymer Science*, $1^{st}$ Supp., Ch. 4, pp. 77–78, Pergamon Press (1992).
Hudlicky, M. (ed.), "Electrochemical Fluorination Process," *Chemistry of Organic Fluorine Compounds*, $2^{nd}$ Ed., pp. 73–76, Ellis Horwood Ltd. (1976).
March, J., "Stereochemistry," *Advanced Organic Chemistry: Reactions, Mechanisms and Structure*, $4^{th}$ ed., pp. 150–161, John Wiley & Sons, Inc. (1992).
Odian, G., "Ziegler–Natta Polymerization of Nonpolar Vinyl Monomers," *Principles of Polymerization*, $2^{nd}$ ed., pp. 591–623, John Wiley & Sons (1981).
Shriver, D., *The Manipulation of Air–sensitive Compounds*, McGraw–Hill, Inc. (1969).
Swasey, C., "Antioxidants," *Plastic Additive and Modifiers Handbook*, Ch. 14, pp. 193–202, Van Norstrand Reinhold (1992).
Tait, P., "Monoalkene Polymerization: Ziegler–Natta and Transistion Metal Catalysts," *Comprehensive Polymer Science*, vol. 4, pp. 1–6, Pergamon Press (1989).
D.A. Armitage, "Organosilanes", *Comprehensive Organometallic Chemistry*, vol. 2, pp. 117–120, Pergamon Press, Oxford (1982).

*Primary Examiner*—David W. Wu

[57] ABSTRACT

A process that involves the in-line polymerization of olefinic monomer(s) and catalyst systems comprising a transition metal species that mediates the polymerization of the monomer(s) is disclosed. This process provides the immediate use of the resultant polymer without extensive further processing.

30 Claims, No Drawings

PROCESS FOR THE IN-LINE POLYMERIZATION OF OLEFINIC MONOMERS

BACKGROUND OF THE INVENTION

1. Field of the Invention

The present invention relates to a process for the polymerization of mixtures comprising olefinic monomers, the polymerization of each monomer being mediated by a transition metal-containing species.

2. Description of Related Art

Polymer films coated on substrates and as stand-alone constructions find a multitude of uses. Likewise, methods of producing polymer films are myriad, depending upon a variety of factors such as, for example, the polymer, the substrate, and the intended end use.

Polymeric coatings are most often produced by distribution of a thin layer of an already-formed polymer onto a substrate from a solvent, an emulsion or a suspension. Alternatively, the polymer may be extruded or hot-melt coated directly onto a substrate so that no solvent or suspending medium is involved.

Free-standing polymer films are prepared by a number of methods, including extrusion, blow molding, and casting, the latter method including the variant of coating onto a release liner and removing the release liner at some later time. In most cases, these methods use already-polymerized compositions.

Coating of monomeric compositions followed by on-substrate polymerization to obtain free-standing films or coated substrates is a less-common procedure. Typically, such procedures involve free-radically polymerizable monomers such as (meth)acrylates and a suitable free-radical initiator; require application of energy to initiate polymerization; normally include a means for controlling the polymerization exotherm associated with highly-reactive monomers; and require the provision of an atmosphere that does not inhibit free-radical polymerizations (i.e., is essentially free of oxygen).

Non-free radical polymerizations of ethylenically-unsaturated monomers are well known. These polymerizations typically use catalysts instead of initiators to effect polymerization. Examples of such polymerizations include Ziegler-Natta polymerizations (ZN), ring-opening metathesis polymerizations (ROMP), group transfer polymerizations (GTP), and cationic and anionic polymerizations. Catalysts for these polymerizations can be more susceptible to deactivation by adventitious oxygen and water, requiring that such deactivating materials be rigorously excluded from all reagents as well as the reaction vessel.

Specifically, ZN (co)polymerizations of monoolefins, particularly α-olefins, are well known in the art. Typically, extreme care is taken to exclude both oxygen and water from these polymerizations.

Likewise, ROMP (co)polymers are known in the art. Examples of ROMP processes in both inert conditions and in the presence of water, oxygen, or both are known.

SUMMARY OF THE INVENTION

Briefly, the present invention provides a process for making a poly(olefin) film in an in-line procedure comprising the steps:

a) providing a substrate coated with a layer of a mixture comprising (1) at least one olefinic monomer, having 5 to 30 carbon atoms, having one of the formulae

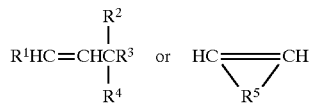

wherein (A) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or (B) $R^1$ and at least one of $R^2$, $R^3$, and $R^4$, as well as the carbon atoms to which they are attached, form at least one strained aliphatic ring, or (C) $R^5$ is $(CR^2R^3)_m$ where m is 1 or 2 and $R^2$ and $R^3$ are independently hydrogen or a $C_1$–$C_{27}$ aryl, aralkyl, aliphatic, or cycloaliphatic group with the provisos that $R^2$ and $R^3$ cannot be hydrogen when m is 1 and that $R^2$ and $R^3$ cannot both be hydrogen when m is 2; and (2) an effective amount of a catalyst system comprising a transition metal-containing species; and b) allowing the monomer(s) to polymerize to a poly(olefin) film.

This process is performed in an environment that is inert toward the above-described catalyst system. By "in-line" is meant a sequential, substantially, continuous process whereby monomer-catalyst mixture is coated directly onto a substrate, preferably a moving substrate.

The process described above involves olefinic monomers whose polymerizations are mediated by a transition metal-containing species. The term "mediated by" means that the transition metal-containing species plays an integral role in the polymerization of the olefinic monomer(s). Common olefinic monomers that polymerize in this manner include α-olefins and ring-strained non-conjugated cyclic olefins. The term "α-olefin" means a compound of the formula $H_2C=CHCR^2R^3R^4$ wherein $R^2$, $R^3$, and $R^4$ are independently hydrogen or a $C_1$–$C_{27}$ aryl, aralkyl, aliphatic, or cycloaliphatic group which can optionally contain one or more heteroatoms.

Ring-strained non-conjugated cyclic olefin monomers undergo a ring opening metathesis polymerization (ROMP) that can be summarized as follows:

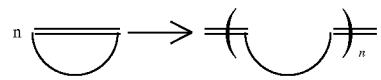

wherein

is a ring-strained non-conjugated cyclic oledin monomer and

illustrates the structure of the resultant ring-opened polymerized unit with n being from 5 to 100,000.

Common catalyst systems in which a transition metal-containing species plays an integral role in the polymerization of one or more olefinic monomers include ZN catalyst systems, metallocene systems, as well as inorganic compounds and organometallic complexes that comprise a metal from Periodic Group 4 to Group 10. Those skilled in the art will readily recognize which catalyst system(s) is/are useful with a given olefin or olefin combination.

The in-line process described above has several advantages over traditional means for making poly(olefin) composite structures. One is increased ease in handling and processing. Traditional methods call for the preparation and collection of poly(olefin) in a batch or continuous process and then solvent or hot melt coating the poly(olefin) onto a substrate with subsequent processing and curing. In the in-line process of the present invention, the need to solvent or hot melt coat the poly(olefin) in a separate step has been eliminated by providing for on-substrate polymerization of the monomer(s).

Another advantage of the in-line process described above is the reduction (or even elimination) of solvents from the composite structure preparation process. Many processes known in the art require solvent in either or both of the polymerization and coating steps. In the in-line process of the present invention, use of solvent is not required and, in some cases, can interfere with the efficient operation thereof.

A third advantage of the in-line process is that it allows for the formation of crosslinked or high molecular weight polyolefins. Post-polymerization processing of such polyolefins has been extremely difficult, if not impossible, to accomplish through extrusion, hot melt, or solvent coating processes, which are inefficient and/or tend to degrade the polymers. Because the polymer is prepared on the substrate in the in-line process of the present invention, a separate coating step and all the attendant problems involved are eliminated. Additionally, a crosslinking agent can be added directly to the monomer-catalyst mixture that is coated on the substrate.

Properties of the poly(olefin) materials produced by the process of the present invention vary depending on the monomer(s) and catalyst system used but are comparable to or better than those of poly(olefin) materials produced by conventional techniques. Commonly, however, these poly (olefins) are used as pressure-sensitive adhesives (PSAs), release (i.e., low adhesion) materials, and vibration damping materials.

DETAILED DESCRIPTION OF PREFERRED EMBODIMENTS

The process of the present invention involves the use of one or more olefin monomers, having 30 or fewer carbon atoms, of the general formula

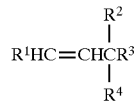

wherein
(a) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or
(b) $R^1$ and one of $R^2$, $R^3$, and $R^4$, as well as the carbon atoms to which they are attached, form at least one strained aliphatic ring, or of the general formula

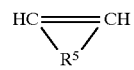

wherein $R^5$ is $(CR^2R^3)_m$ where m is 1 or 2 and $R^2$ and $R^3$ are independently hydrogen or a $C_1$–$C_{27}$ aryl, aralkyl, aliphatic, or cycloaliphatic group with the provisos that $R^2$ and $R^3$ cannot be hydrogen when m is 1 and that $R^2$ and $R^3$ cannot both be hydrogen when m is 2. Such olefinic monomers include α-olefins and ring-strained non-conjugated cyclic olefins. Those skilled in the art will recognize which monomers (or combination thereof) provide a given desired property (e.g., a PSA composition or a release material).

The process of the present invention involves the use of a monomer or mixture of monomers that is at least somewhat fluid or flowable at a temperature between about 15° and about 150° C., preferably between about 20° and 125° C., more preferably between about 20° and 100° C., most preferably between about 20° and 50° C. Where a solid monomer is to be included, it must be sufficiently soluble in the other liquids, preferably the other monomer(s), so as to form a homogeneous coatable mixture that can be applied to the substrate.

Where the monomer(s) comprise one or more α-olefins, at least one of the monomers will normally be a $C_5$–$C_{30}$ α-olefin, preferably a $C_6$–$C_{20}$ α-olefin, most preferably a $C_6$–$C_{12}$ α-olefin. Such an olefin can either be straight chain or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, 4-methyl-1-pentene, allyltrimethylsilane, and allylbenzene. These monomers can optionally be substituted with conventional substituents (i.e., those that do not interfere with the polymerization of, or the desired properties of the polymer produced from, these monomers). Blends of these monomers or one or more of these monomers plus a lower (i.e., $C_2$–$C_4$) 1-alkene are also within the scope of the present invention.

Ring-strained non-conjugated cyclic olefins useful in the present invention include those described in U.S. Pat. No. 5,296,566, which list of monomers is incorporated herein by reference, and include monocyclic mono- and polyolefins and polycyclic mono- and polyolefins. These cyclic olefins can be substituted with up to four saturated or unsaturated hydrocarbyl, alkaryl, aralkyl or aryl groups, in which "alkyl" or "alk" or "hydrocarbyl" can be linear, branched or cyclic, each group containing up to 30 carbon atoms, up to sixty halogen atoms, and up to four heteroatoms selected from non-peroxidic O, N, and Si, which can be combined to form functional groups or linkages including ethers, alcohols, alkoxides, ketones, aldehydes, carboxylic acids, esters, amides, imides, amines, cyanides, anhydrides, organosilicons, organosilicones, oxysilanes, alkoxysilanes, and the like.

Preferred monocyclic monoolefins include substituted and unsubstituted cyclopropene, cyclobutene, cyclopentene, cycloheptene and cyclooctene. Preferred polycyclic monoolefins include substituted and unsubstituted norbornene and bicyclo[2.2.2]-oct-2-ene. Preferred polycyclic polyolefins include substituted and unsubstituted norbornadiene and dicyclopentadiene. In the cases of substituted norbornene and dicyclopentadiene, endo/exo, syn/anti, or combinations of any of these isomers are suitable. Examples of suitable monomers include 5-methyl-2-norbornene, 5-ethyl-2-norbornene, 7-methyl-2-norbornene, 1-methyl-2- norbornene, 5,6-dimethyl-2-norbornene, 5-norbornene-2-carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol-5-norbornene-2-ol, 2-acetyl-5-norbornene, 5-norbornene-2-yl acetate, 2-benzoyl-5-norbornene, 5-vinyl-2-norbornene, 5-methylene-2-norbornene, 5-norbornene-2-methanol acrylate, 5-[2-(trimethylsilyl)ethyl]-2-norbornene, 5-[2-(pentamethyldisiloxyl)ethyl]-2-norbornene, 5-chloromethyl-2-norbornene, 2,3-di(chloromethyl)-5-norbornene, 5-trifluoromethyl-2-norbornene, and 2,3,3-trifluoro-2-trifluoromethyl-5-norbornene. Other suitable monomers are described in U.S. Pat. Nos. 5,011,730, 4,994,535, 4,945,144, 4,943,621, 4,923,943, 4,923,936, and 4,250,063, each of which is incorporated herein by reference. All these materials are commercially available (e.g., Aldrich Chemical Co.; Milwaukee, Wis.) or can be prepared as described in the chemical literature with the possible exception of 5-[2-(trimethylsilyl)ethyl]-2-norbornene and 5-[2-(pentamethyldisiloxy)ethyl]-2-norbornene which are prepared by the reaction of 5-vinyl-2-norbornene with trimethylsilane or pentamethyldisiloxane, respectively, in the presence of platinum-containing catalysts using published procedures for the hydrosilation of alkenes (see D. A. Armitage, "Organosilanes," *Comprehensive Organometallic Chemistry*, vol. 2, 117–20, Pergamon Press, Oxford (1982)). Preferably, at least one of the cyclic olefins of the present invention is polycyclic, more preferably substituted norbornene or substituted or unsubstituted dicyclopentadiene.

Catalysts that can be used in the process of the present invention include those systems that comprise a transition metal-containing species. Where at least one of the olefinic monomers is an α-olefin, useful catalysts include metallocenes and ZN systems. By "ZN systems" is meant the combination of certain transition metal compounds (commonly halides) with alkyl, aryl, or hydride derivatives of metals from Periodic Groups 1–5, particularly Groups 4 and 5, in an inert solvent or diluent and under inert conditions. Among the most preferred ZN systems is $TiCl_3$ (optionally supported on an inert material such as $MgCl_2$ or polypropylene) combined with an aluminum alkyl such as $Al(C_2H_5)_3$. Such a system optionally can be introduced as a slurry or suspension in an inert solvent such as toluene or heptane. Those skilled in the art will readily recognize other useful ZN systems. With respect to metallocene systems, particularly useful metal containing compounds include those that comprise Ti, Zr, Hf, or V. An example of such a system is $(C_{13}H_9)Zr(CH_3)_2$ combined with either $C_{18}H_{37}OH \cdot B(C_6F_5)_3$ or methylaluminoxane. Metallocene catalyst systems commonly are added to the monomer(s) as a solution in an aromatic solvent such as toluene or xylene.

Where at least one of the olefinic monomers is a ring-strained non-conjugated cyclic olefin, useful catalysts include Periodic Groups 4–10 transition metal compounds and complexes, particularly those that comprise at least one of Mo, W, Ru, Os, Ti, Re, and Ir. Although heterogeneous catalysts can be used, homogeneous ones are preferred. Cocatalysts can be used in combination with certain transition metal-containing species. Traditional catalysts include compounds having one or more alkyl groups bonded to a non-transition metal (i.e., those from Periodic Groups 1–2 and 12–14), although some recently described catalysts can be used with Lewis acids, oxidizing agents, silanes, heteroatom-containing olefins, and alkynes. Although well known air- and water-sensitive catalysts can be used, those that are air and moisture stable are preferred. One- and two-part catalysts that are air- and moisture-stable are more fully described in the Background, Summary, and Detailed Description sections of the previously-incorporated U.S. Pat. No. 5,296,566.

As those skilled in the art will recognize from this discussion, the process of the present invention is not limited by a particular catalyst or catalyst system. The identity of the catalyst is unimportant as long as it effects the polymerization of the monomer(s) being used.

Those skilled in the art will also recognize that keeping the concentration of catalyst as low as possible is desirable so as not to degrade the performance characteristics of the resultant polymer. Effective concentrations will vary depending on the particular catalyst system used, and those skilled in the art will recognize useful concentrations for a given polymerization.

Many of the above-described catalysts are sensitive to a variety of substances including, particularly, water and oxygen. For example, both ZN and metallocene systems are very sensitive to both water and oxygen. When one of these or another sensitive catalyst systems is used, the process of the present invention provides for the substantial exclusion of the catalyst-quenching materials. The particulars of how this exclusion is accomplished is more fully detailed below in the description of the process below.

Where the monomer is one or more ring-strained non-conjugated cyclic olefins and the catalyst used is not sensitive to, for example, active hydrogen-containing compounds, an antioxidant can be included in the polymerizable mixture. Antioxidants are useful in inhibiting degradation of the resultant polymers. Adding antioxidant to the polymerizable mixture eliminates the need for an additional processing step in which antioxidant is subsequently added to the polymer. Useful antioxidants include, but are not limited to, hindered phenols, hindered amines, and triazines. Where such an antioxidant is used, it preferably makes up 0.01 to 5% (by weight) of the mixture.

The process of the present invention can be performed essentially solvent-free. Some solvent, such as that used to introduce the catalyst into the mixture (e.g., a solution, slurry, or suspension) might be present. Costly and complicated post-polymerization processing steps can be avoided by eliminating or substantially reducing the amount of solvent used. This advantage should not be considered limiting, however. If the presence of solvent were deemed to be advantageous for a given polymerization (e.g., dissipation of heat or modification of polymerization rate), the process of the present invention allows for the presence of such a solvent.

A significant advantage provided by the process of the present invention is the ability to include a crosslinking agent directly in the monomer(s) or the polymerizing mixture. Accordingly, an article coated with a layer of a crosslinked polymer can be obtained conveniently. Depending on the monomer(s) and catalyst system chosen, many crosslinking agents are potentially useful. However, preferred crosslinking agents include organic compounds comprising two or more unsubstituted, terminal olefinic groups wherein the olefinic groups are separated by at least three carbon atoms (e.g., 1,13-tetradecadiene and 1,7-octadiene) and organic compounds comprising two or more non-conjugated ring strained cyclic olefinic groups (e.g., dicyclopentadiene and α,ω-di(5-norbornene-2-yl)alkenes).

Other adjuvants can be present in the mixtures that undergo the process of the present invention. Common adjuvants that can be used include, but are not limited to, plasticizers, tackifiers, oils, polyenes, oligomers and/or polymers (including rubber and elastomers), viscosifiers, chain transfer agents, and fillers. Regardless of type or identity, any adjuvant used must not deactivate the transition metal-containing catalyst system. For example, where a ZN system is used to catalyze an α-olefin polymerization, the presence of an adjuvant that contains an active hydrogen atom would be counterproductive.

The in-line process of the present invention involves two steps: coating and polymerization. Normally, a substrate used in the in-line process of the present invention will be coated with a polymerizing mixture. By "polymerizing mixture" is meant one that is in the process of polymerizing as it is being coated. This on-going polymerization is a result of the catalyst system and monomer(s) being admixed prior to being applied to the substrate. The reason for this preliminary admixing is to uniformity disperse the catalyst system throughout the monomer. This catalyst-monomer mixing results in the initiation of polymerization which, in turn, increases the viscosity of the mixture and allows it to be more easily coated. The polymerizing mixture is preferably subtantially chemically and physically non-reactive toward the substrate.

Preferred substrates include tape backings and continuous belts. Typical tape backings include cellulosic materials such as paper, creped paper, and cloth; films such as biaxially oriented polyester or biaxially and monoaxially oriented polypropylene; nylon; and metal foils such as aluminum foil. The back side of the backings can be treated with a release coating such as silicone. Backings can be treated prior to being coated to enhance the adhesion thereto.

Coating a substrate with neat monomer(s) while providing a means to prevent the monomer(s) from running off the substrate is also possible. For example, two barriers, preferably perpendicular to the substrate, could be provided that confine the monomer(s) to the substrate during processing and polymerization. Alternatively, application of a viscosifier-containing monomer mixture to a substrate with the subsequent addition of catalyst is also possible. Those skilled in the art will recognize numerous other means for keeping neat monomer(s) on a substrate; nevertheless, coating a substrate with a polymerizing mixture is preferred in the in-line process of the present invention.

Once a substrate has been coated with the above-described mixture, the monomer(s) in that mixture are allowed to continue polymerizing. Advantageously, the olefinic monomers useful in the present invention (i.e., those whose polymerization is mediated by a transition metal species) often polymerize at or near room temperature. However, where desired, the temperature at which the in-line process is carried out can be varied. For example, where reduction of the rate of a given polymerization or the production of a narrow molecular weight distribution is desired, the process can be carried out at a reduced temperature (i.e., from about 0° C. up to about 15° C.). Alternatively, where a fast polymerization or a polymer with a lower molecular weight is desired, the process can be carried out at an elevated temperature. The temperature profile for the polymerization (including starting and ending temperatures as well as any temperature ramping) is preferably selected to minimize volatilization of monomers. (Although temperatures up to 150° C. are potentially useful, temperatures between about 20° and 125° C. are preferred, temperatures between about 20° and 100° C. are more preferred, and temperatures between about 20° and 50° C. are most preferred.) Once the mixture has substantially polymerized, the coated substrate can be subjected to conditions (i.e., temperature, pressure, or a combination thereof) that will volatilize unreacted monomer from the polymer-coated substrate.

Useful monomers and catalysts have been described previously. Some of these catalysts or catalyst systems are sensitive to oxygen, water, active-hydrogen-containing compounds, and a variety of other chemical species. Where such a sensitive catalyst is used, the in-line process of the present invention must be carried in an environment that is inert toward that catalyst. (Where the catalyst used is oxygen- and water-stable, open air would be considered an environment that is inert toward that catalyst system.) In other words, those chemical species that can deactivate the catalyst must be excluded from the process. This exclusion can be accomplished in a variety of ways. One such method is to carry out the process in an atmosphere that is substantially free of those chemical species that are not inert toward the catalyst system. A convenient way to attain such an atmosphere is to purge the area in which the in-line process is being performed with an inert gas (e.g., nitrogen or a noble gas). Where a purge is inconvenient or impractical, the coated mixture can be covered with barrier layer that is substantially impermeable to the chemical species that are not inert toward the catalyst system. When such a barrier layer is used, the substrate is also substantially impermeable to the deactivating chemical species. In such a dual barrier layer arrangement, the substrate can be made of the same or different material as the top barrier layer. In a preferred embodiment, the substrate and the barrier layer exhibit differential adhesion to the polymer formed from the coated mixture.

This barrier layer, whether it covers the coated mixture, acts as the substrate therefor, or both, is preferably substantially chemically and physically non-reactive toward the coated mixture. In other words, the mixture preferably does not react with or sorb to the barrier layer. Materials that can be used as barrier layers include polymers; metals; and fibrillar webs (e.g., fibrillated polytetrafluoroethylene, paper, etc.) impregnated with, coated with, or having adhesively adhered thereto one or more polymer films. Preferred films are based on polypropylene, polyethylene, polytetrafluoroethylene, polyethylene terephthalate, polybutadiene, polyvinylchloride, polyvinylidenechloride, cellulose acetate, and the like.

Reinforced poly(olefin) compositions also can be obtained from the process of the present invention. A reinforcing matrix (e.g., a nonwoven web, scrim, etc.) can be placed on a substrate and coated or saturated with the polymerizing mixture.

Poly(olefins) exhibiting a z-axis (i.e., top to bottom) compositional gradient or differential can be prepared according to the process of the present invention. A useful environment in which to produce such a poly(olefin) is an atmosphere comprised (at least) in part of a purified lower 1-alkene (i.e., a gaseous monomer). Preferred among such 1-alkenes are ethylene and propylene, particularly ethylene. By "purified" is meant that potential catalyst-destroying materials have been substantially eliminated. When this is done, the lower 1-alkene has been found to diffuse into the coated mixture. (The lower 1-alkene can be added to the coated mixture in other ways, but it preferably is added at some point after the mixture has been coated on the substrate.) Lower 1-alkenes tend to polymerize much more rapidly than higher α-olefins under similar circumstances. Accordingly, the upper portion of the coating becomes enriched, relative to the remainder of the coating, in the polymer derived from the lower 1-alkene. This leads to a compositional gradient or differential through the thickness of the polymer. The profile of such a gradient will depend on a variety of factors including the concentration of the lower 1-alkene in the atmosphere, the polymerization temperature, and the viscosity of the coating at the time the lower 1-alkene is introduced.

Polymers derived from lower 1-alkenes are crystalline and are not tacky, whereas polymers derived from higher α-olefins are not crystalline and exhibit pronounced tack. Where a coating comprises an upper layer that includes a higher concentration of 1-alkene (e.g., polyethylene) and the remainder includes a higher concentration of a polyolefin (e.g., polyoctene), the coating can display graded or differential tack. Gradients or differentials in other physical, chemical, and/or mechanical properties are also possible depending on the combination of monomers used. A polymeric coating that exhibits graded or differential tack can be useful as, for example, an adhesive tape or a protective coating.

Once the mixture (regardless of the particular monomer(s) used and the presence or absence of adjuvants) has substantially completely polymerized, the substrate, upper barrier layer (when present), or both can be removed to provide a self-supporting polymer film or laminate construction. Such films and laminates are potentially useful as release materials, PSAs, heat-activated adhesives, vibration damping materials, transfer adhesives, structural adhesives, and protective coatings.

Objects and advantages of this invention are further illustrated by the following examples. The particular materials and amounts thereof, as well as other conditions and details, recited in these examples should not be used to unduly limit this invention.

EXAMPLES

Example 1

A catalyst solution such as is described in Example 25 of U.S. Pat. No. 5,296,433, the teaching of which is incorporated herein by reference, was prepared in a dry box under a nitrogen atmosphere by adding a solution of 0.013 g tris(pentafluoro-phenyl)boron and 0.007 g octadecanol in 1 ml dry toluene to a solution of 0.012 g bis(fluorenyl) zirconium dimethyl. The catalyst solution was added to 40.0 g 1-hexene (Aldrich Chem. Co.), in a dry box under a nitrogen atmosphere, and the reaction mixture stirred for approximately one hour, during which time the viscosity of the mixture advanced to a syrup-like consistency.

An aliquot of this polymerizing mixture was coated on a polypropylene sheet with a stirring rod to form a film with a thickness of approximately 0.13 mm. The film was covered with an inverted glass dish to retard monomer evaporation and allowed to polymerize at ambient conditions in the dry box. After approximately 13 hours, the 1-hexene had polymerized to a continuous film of an adhesive-like polymer.

A second aliquot of the polymerizing mixture was transferred to a glass dish, spread out to form a thin film, covered with an inverted glass dish and allowed to polymerize under ambient conditions in the dry box. After approximately 13 hours, the coated dish was removed from the dry box, and a piece of filter paper was pressed onto the tacky film. The filter paper displayed sufficient adhesion to the polymer film to support the weight of the dish. Gel permeation chromatography (GPC), using polystyrene standards, of the polymer indicated that it had a weight average molecular weight ($M_w$) of $2.0 \times 10^6$.

This example illustrates the on-substrate polymerization of a liquid olefin monomer using a soluble, homogeneous catalyst.

Example 2

A ZN catalyst was prepared in a dry box under a nitrogen atmosphere by slurrying $TiCl_3$ supported on $MgCl_2$, commercially available as LYNX™ 1000 catalyst (Catalyst Resources, Inc.; Houston, Tex.) in mineral oil to produce a uniform suspension containing 1.26 mg Ti/ml. To 5 ml heptane containing 0.27 ml of a 1M solution of triethylaluminum (Ethyl Corp.; Baton Rouge, La.) was added 0.5 ml of the $TiCl_3$ suspension. This mixture was stirred for approximately one minute.

In a dry box, 1.5 ml of the activated catalyst suspension was added with stirring to 35.7 g 1-octene (Aldrich Chem. Co.). The resulting mixture was stirred until it had a syrup-like consistency (approximately 3 minutes) at which time aliquot portions of the polymerizing mixture were coated on polypropylene sheets with a stirring rod to a thickness of approximately 2 mm. The coated films were covered with inverted glass dishes to retard monomer evaporation and allowed to polymerize under ambient conditions in the dry box for approximately 12 hours. The resulting adherent polyoctene films displayed adhesive-like properties.

This example illustrates the use of a heterogeneous catalyst for the on-substrate polymerization of a liquid olefin monomer.

Example 3

A solution of 36 g 1-octene and 9 g Regalrez™ 1085 hydrogenated tackifier (Hercules Corp.; Wilmington, Del.) was polymerized in a dry box under a nitrogen atmosphere by adding, with stirring, 2 ml of the ZN catalyst suspension described in Example 2. The resulting mixture advanced to a syrup-like consistency in approximately 8 minutes, at which time aliquot portions of the mixture were transferred to two polyproplyene sheets, one having a smooth surface and the other having a roughened texture. Each sheet was coated with an aliquot portion of the mixture using a stirring rod to produce an approximately 2 mm thick film. The coated sheets were covered with inverted glass dishes to retard monomer evaporation and allowed to polymerize under ambient conditions in the dry box for approximately 12 hours. Unreacted monomer was removed by placing the polymer-coated sheets in a vacuum chamber and maintained at a pressure of 3.3 kPa (25 mm Hg) for about 8 hours. The resulting adherent plasticized polyoctene films displayed adhesive-like properties.

This example illustrates the on-substrate polymerization of a liquid olefin monomer that has been combined with a tackifier to lower the glass transition temperature of the resulting polymer.

Example 4

A plasticized polyoctene film was prepared according to the procedure of Example 3 except that 0.084 g 1,13-tetradecadiene (Aldrich) was added to the polymerizing mixture. Adherent plasticized, lightly cross-linked polyoctene films displaying adhesive-like properties were produced after approximately 12 hours polymerization under ambient conditions in the dry box. Excess polymerization mixture kept in a sealed bottle in the dry box for the same time period polymerized to 86% conversion.

This example illustrates the polymerization of a liquid olefin monomer that has been combined with a tackifier and a crosslinking agent. Polymers produced from such mixtures typically exhibit excellent shear properties.

Example 5

A solution of 5.97 g Kraton™ 1657G styrene/ethylene-butylene copolymer (Shell Oil Company; Houston, Tex.)

and 15.0 g Regalrez™ 1085 tackifier in 35.7 g 1-octene containing 0.2 ml of a 1M solution of triethyl aluminum in hexane was polymerized in a dry box under a nitrogen atmosphere according to the procedure described in Example 3 utilizing 2 ml of the ZN catalyst suspension described in that example. The polymerizing mixture was vigorously stirred for approximately one minute prior to coating on polypropylene sheet and then allowed to polymerize under ambient conditions in the dry box for approximately 12 hours. A tough, tacky, adhesive-like film on the polypropylene sheet was produced. Transmission electron microscopic examination of a thin section of the polymerized film revealed large, irregular areas of Kraton that were tens of microns in size.

Excess polymerization mixture kept in a sealed bottle in the dry box for he same time period polymerized to 98% conversion.

This example illustrates the on-substrate polymerization of a liquid olefin monomer in conjunction with the addition of a second polymer phase to act as a reinforcing component.

Example 6

A ZN catalyst was prepared according to the procedure of Example 2 by adding 1.5 ml of the precursor-in-mineral oil to 5 ml heptane containing 0.74 ml of 1M triethylaluminum in hexane. The resulting suspension was stored in a tightly sealed bottle. A solution of 35 g Regalrez™ 1085 tackifier in 71.5 g 1-octene was also prepared in a dry box under a dry nitrogen atmosphere and stored in a tightly sealed bottle. Both bottles were transferred to a nitrogen-purged coater having an oxygen content of approximately 8 ppm, the catalyst suspension added to the tackifier/octene solution, and the resulting mixture stirred for approximately 2 minutes during which time the mixture acquired a syrup-like consistency. The polymerizing mixture was coated onto a polypropylene sheet to an approximate thickness of 0.13 mm. The coated sheet was immediately covered with a release coated polypropylene film, the silicone release coating being in contact with the polymerizing mixture. Approximately 11 m of a 15.2 cm wide trilayer laminate was maintained under a nitrogen atmosphere for approximately 8 minutes before exiting the nitrogen purged coater apparatus and being wound on a takeup roll.

A layer of adhesive material covered each film when the laminate construction was separated. The force required to separate the laminate construction increased with time, indicating that polymerization of the tackifier/octene solution continued after the trilayer laminate exited the nitrogen purged coater apparatus. Polymerization of the tackifier/octene solution in the trilayer laminate construction was accelerated by placing sections of the laminate in an air circulating oven at approximately 65° C. for about 5 minutes.

Example 7

A trilayer laminate of a tackified, lightly crosslinked polyoctene adhesive composition between two polypropylene films was prepared according to the general procedure of Example 6 except that the catalyst/monomer mixture was prepared in the antechamber of the nitrogen-purged coating apparatus. A catalyst/monomer mixture was prepared by adding 1.5 ml catalyst precursor suspension in mineral oil to 71.5 g 1-octene containing 20 g Regalrez™ 1085 tackifier, 0.1 g 1,13-tetradecadiene, and 1.5 ml 1M triethylaluminum in hexane. The resulting mixture was stirred for approximately 3 minutes before being transferred to the coater where a layer of the polymerizing mixture having a thickness of approximately 0.13 mm was coated between two polypropylene sheets. That the polymerization of the tackifier/octene/tetra-decadiene solution continued after the trilayer laminate exited the nitrogen-purged coater apparatus was evidenced by the fact that the force required to separate the laminate construction increased with time.

Example 8

A 4.5 ml portion of the active ZN catalyst described in Example 2 was added to 37.5 g 1-octene. The resulting mixture was stirred for approximately 3.5 minutes, and an approximately 2 mm thick coating of the polymerizing mixture was applied to the silicone release-coated side of a 0.05 mm thick poly(ethylene terephthalate) sheet. The coated film was placed in the bottom of a glass dish covered with a lid fitted with an inlet tube that terminated in a series of downwardly directed nozzles and a vent tube. The inlet tube was connected to a ethylene tank having a valve adjusted to maintain a low volume flow of ethylene gas, thereby creating an ethylene rich atmosphere in the covered dish. The ethylene flow was discontinued after approximately 5 seconds, and the coating was allowed to polymerize in the ethylene enriched nitrogen atmosphere for approximately 12 hours at ambient temperature and pressure.

Residual monomer and solvent were volatilized from the polymerized film by placing the film under vacuum. The film was placed between two silicone-coated release liners and two strips measuring 2.5 cm×12.5 cm were cut therefrom. The release liners were removed and each strip was laminated to the adhesive side of a strip of Scotch™ 8403 tape (3M; St. Paul, Minn.) such that the ethylene-rich surface was exposed on one strip and the octene-rich surface (i.e., the surface adjacent to the release coating during polymerization) was exposed on the other strip. Each strip was laminated to a glass plate secured to an I-MASS™ peel tester (Instrumentors, Inc.; Strongsville, Ohio) and subjected to 180° peel testing at a rate of 25 cm/min. The peel strength of the ethylene-rich surface was 1.1N/dm while the peel strength of the octene-rich surface was 31.0N/dm.

This example illustrates the on-substrate polymerization of a liquid olefin monomer in the presence of a gaseous olefin comonomer to produce a poly(olefin) exhibiting graded tack.

Example 9

A ZN catalyst suspension prepared as described in Example 2 was injected into a stirred solution of 23.7 g 1-octadecene (Aldrich Chem. Co.) and 2.1 g 1-octene containing 0.2 ml 1M triethylaluminum (in hexane) in a dry box under a nitrogen atmosphere. The resulting mixture was stirred for approximately 4 minutes and then coated on a flat polypropylene sheet to form a thin film. The film was kept in the dry box for approximately 6 hours at 45° C. to produce a smooth, non-sticky, almost waxy film. Scotch™ Magic Mending™ tape (3M) would not adhere to the polymerized coating.

This example illustrates the on-substrate polymerization of a liquid olefin monomer in conjunction with another liquid olefin comonomer to produce a polymer having release surface-like properties and the use of heat to accelerate the polymerization reaction.

Example 10

5-hexyl-2-norbornene (i.e., 5-hexyl-bicyclo[2.2.1]hept-2-ene, or HNB), 5-butyl-2-norbornene (5-butyl-bicyclo[2.2.1]

hept-2-ene, or BNB), and 5-octyl-2-norbornene (5-octyl-bicyclo[2.2.1]hept-2-ene, or ONB) were prepared as described in U.S. Pat. No. 3,546,183, the teaching of which is incorporated herein by reference. In all preparations, the indicated compounds were distilled from the reaction mixture to obtain a mixture of endo and exo alkyl substituted norbornene isomers. The distillation products contained varying amounts of cyclopentadiene dimer ($Cp_2$) and trimer ($Cp_3$), as indicated by gas chromatography of the distillates and noted in subsequent examples.

Throughout these examples, $[N(SO_2CF_3)_2]^-$ is referred to as (DSN). Li(DSN) is available as HQ115 from 3M Specialty Chemicals Division (St. Paul, Minn.). H(DSN) can be prepared by adding Li(DSN) to 96% analytical reagent-grade sulfuric acid, followed by distillation at reduced pressure. To prepare $Zn(DSN)_2$, 20.0 g distilled H(DSN) was added slowly to a stirred slurry of 4.46 g zinc carbonate in 50 g deionized water. The final pH was 7–8. The mixture was filtered to remove any unreacted zinc carbonate and the clear filtrate was concentrated to yield a white crystalline salt, $Zn(DSN)_2$.

The above-described monomers were polymerized by adding catalyst solution (prepared by dissolving iridium catalyst, optional cocatalyst, and optional stabilizer in tetrahydrofuran (THF)) to the monomers indicated in Table 1. The resulting mixtures were poured into open-faced metal pans to a depth of 0.4 to 1.7 mm, placed in an oven at 90° C. and allowed to polymerize. After about two minutes (depending on catalyst level, shorter times for higher catalyst levels), a free standing film could be lifted from the pan. Samples were kept at 90° C. for 3 to 5 minutes.

TABLE 1

Alkyl Norbornene Polymerizations

| Sample Number | Monomer | Crosslinker[1] | Ir Compound (mg per g monomer) |
|---|---|---|---|
| 13a | HNB | 0 | 4.2[2] |
| 13b | ONB | 3.9% $Cp_3$ | 7.1[3] |
| 13c | HNB/ONB (95/5 wt. %) | 0.20% $Cp_3$ | 3.4[3] |
| 13d | BNB | 9.12% $Cp_2$ | 4.8[3] |
| 13e[4] | HNB | 0.5% $Cp_3$ | 8.6[5] |

[1]Crosslinker levels of $Cp_2$ or $Cp_3$ present in alkyl norbornene. Detection limits are 0.05% or better, and impurity levels are expressed as integrated area percentages based on flame ionization detection.
[2]40.4 mg [Ir(cyclooctene)$_2$Cl]$_2$, 51.8 mg Zn(DSN)$_2$, and 103.2 mg Irganox ™ 1010 antioxidant (Ciba-Geigy Corp.; Hawthorne NY) dissolved in 4.45 g THF.
[3]40.0 mg [Ir(cyclooctene)$_2$Cl]$_2$, 41.4 mg Zn(DSN)$_2$ and 83.9 mg Irganox ™ 1010 antioxidant dissolved in 4.45 g THF.
[4]Polymerized at 115° C. for 1.25 minutes.
[5]33 mg [Ir(cyclooctadiene)Cl$_2$], 30 mg Zn(triflate), 63 mg Irganox ™ 1010 antioxidant in 3.83 g HNB with no added solvent.

Samples 13b, 13c, and 13e formed crosslinked polymer gels that could not be dissolved in toluene, while sample 13d dissolved partially. GPC, using polystyrene standards, of film 13a indicated a number average molecular weight ($M_n$) of $3.20 \times 10^5$ and a $M_w$ of $9.02 \times 10^5$.

The data of Table 1 demonstrate the on-substrate polymerization of alkyl norbornene monomers in air with different catalysts and cocatalysts, optionally in the presence of crosslinkers.

Example 11

Two samples of 5-hexyl-2-norbornene containing 0.5% $Cp_3$ with different levels of tackifying additive, as indicated in Table 2, were prepared. A catalyst solution of 23 mg [Ir(cyclooctadiene)Cl]$_2$, 33 mg Zn(DSN)$_2$, and 269 mg Irganox™ 1010 antioxidant in 2.2 g THF was added to each sample, and the mixtures knife-coated onto 0.036 mm (1.4 mil) polyester backing at a thickness of 3 mil. Samples were cured in an oven at the times and temperatures indicated to give tacky adhesive materials. Peel force (at 180°) was measured as the amount of weight required to pull a 1-inch piece of tape at about 229 cm/min (90 in/min).

TABLE 2

Alkylnorbornene/Tackifier Polymerizations

| Sample | HNB (g) | Tackifier Type/ Weight (g) | Cure (°C./min) | Peel[1] (g/cm) |
|---|---|---|---|---|
| 14a | 10.55 | Regalrez ™ 1126[2] /3.51 | 102° C./1.0 | 110 |
| 14b | 7.97 | Regalrez ™ 1126[2] / 2.65 plus Indopol H 1500[3] / 3.36 | 116° C./2.0 | 550–1100 |

[1]Peel was somewhat shocky and some adhesive transfer was observed.
[2]A $C_5$ resin tackifier (Hercules Chemical Co.; Wilmington, DE).
[3]A polybutene tackifier (Amoco Chemical Co.; Chicago, IL).

This example demonstrates the polymerization of a ring-strained olefin in the presence of tackifying additives to produce a pressure sensitive adhesive.

Example 12

A series of samples containing 55.0 g 5-hexyl-2-norbornene, containing no crosslinker, and catalyst solution (1.9 mg [Ir(cyclooctene)$_2$Cl]$_2$ dissolved in 0.5 gm $CH_2Cl_2$) and 0.5 g of the solvents indicated in Table 3 were prepared. Each sample was mixed to obtain a homogeneous mixture, promptly poured into open faced metal pans (film thickness about 0.7 mm, including solvent) and immediately heated in a 90° C. oven. The rates of polymerization for each composition, as determined by inspection, are indicated in Table 3. Film thickness upon solvent evaporation and completion of polymerization was approximately 0.2 mm.

TABLE 3

Solvent Retarded Polymerization

| | | Cure Time (sec) | | | | | |
|---|---|---|---|---|---|---|---|
| Sample | Solvent | 20 | 40 | 60 | 120 | 180 | Other |
| 12a | $CH_2Cl_2$ | 1 | 2 | 3 | 4 | | |
| 12b | THF | 0 | 1 | 2 | 3 | 4 | |
| 12c | toluene | 1 | 2 | 3 | 3 | 3 | 4 at 270 sec |
| 12d | acetone | 0 | 1 | 2 | 3 | 4 | |
| 12e | MEK | 0 | 1 | 1 | 2 | 3 | 4 at 270 sec |

The degree of cure of the reaction mixture was defined according to the following scale:

1=more viscous solution than the monomer solution;
2=liquid having sufficient viscosity to leave a line trace when a stick was pulled through the solution;
3=soft solid; and
4=free standing film that could be removed from the pan.

In these samples the polymerization rates increased as solvent evaporated from the samples. In similar samples, kept in closed containers at ambient temperature so that solvent could not escape, polymerization occurred to give a solution too thick to flow after ≦15 min for $CH_2Cl_2$, while samples containing THF or toluene were viscous but would still flow. (Samples containing acetone and MEK formed a polymer precipitate, and therefore no direct comparison with $CH_2Cl_2$ could be made for these solvents in the closed containers.)

This example demonstrates the effect of using different catalyst solvent systems to affect polymerization rates. In particular, some solvents are observed to retard polymerization rates, and are particularly useful in maintaining lower viscosity in a polymerizable mixture prior to coating and polymerization by heating and simultaneous evaporation of solvent.

Various modifications and alterations that do not depart from the scope and spirit of this invention will become apparent to those skilled in the art. This invention is not to be unduly limited to the illustrative embodiments set forth herein.

We claim:

1. A process for making a poly(olefin) film in an in-line procedure comprising the steps:
   a) coating a substrate with a layer of a mixture comprising
      1) at least one olefinic monomer, having 5 to 30 carbon atoms, having one of the formulae

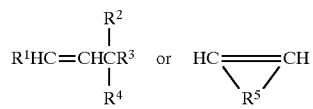

wherein
   (A) $R^1$ is hydrogen and $R^2$, $R^3$, and $R^4$ are independently hydrogen or a $C_1$–$C_{27}$ aryl, aralkyl, aliphatic, or cycloaliphatic group, with the provisos that at least one of $R^2$, $R^3$, and $R^4$ must be hydrogen and that $R^2$, $R^3$, and $R^4$ cannot all be hydrogen, or
   (B) $R^1$ and at least one of $R^2$, $R^3$, and $R^4$, as well as the carbon atoms to which they are attached, form at least one strained aliphatic ring, and
   (C) $R^5$ is $(CR^2R^3)_m$ where m is 1 or 2 and $R^2$ and $R^3$ are independently hydrogen or a $C_1$–$C_{27}$ aryl, aralkyl, aliphatic, or cycloaliphatic group with the provisos that $R^2$ and $R^3$ cannot be hydrogen when m is 1 and that $R^2$ and $R^3$ cannot both be hydrogen when m is 2; and
      2) an effective amount of a catalyst system comprising a transition metal-containing species; and
   b) allowing said at least one monomer in said layer on said substrate to polymerize to a poly(olefin) film.

2. The method of claim 1 wherein said polymerization is performed at ambient temperature.

3. The method of claim 1 further comprising at least one of the following steps subsequent to said polymerization step:
   c) subjecting said coated substrate to a combination of temperature and pressure that will drive off any remaining said at least one monomer; and
   d) separating said substrate from said film.

4. The method of claim 1 wherein the process is performed in an inert environment, wherein the inert environment is an atmosphere that is substantially free of those chemical species that deactivate said catalyst system in a manner that prevents any polymerization according to step (b).

5. The method of claim 4 wherein said chemical species is at least one of oxygen and water.

6. The method of claim 1 wherein said mixture is substantially chemically and physically non-reactive toward said substrate.

7. The method of claim 4 wherein said inert environment is provided by covering said coated mixture with a barrier layer that is substantially impermeable to those chemical species that are not inert toward said catalyst system, wherein the inert environment is an atmosphere that is substantially free of those chemical species that deactivate said catalyst system in a manner that prevents any polymerization according to step (b).

8. The method of claim 7 wherein said chemical species is at least one of oxygen and water.

9. The method of claim 7 wherein said substrate is a second barrier layer, said second barrier layer being the same as or different from said first barrier layer.

10. The method of claim 9 wherein said substrate and said barrier layer release differentially from said mixture after said at least one monomer as polymerized.

11. The method of claim 7 wherein said mixture is substantially chemically and physically non-reactive with said barrier layer.

12. The method of claim 7 wherein said barrier layer comprises a polymer.

13. The method of claim 12 wherein said polymer is selected from the group consisting of polypropylene, polyethylene, polytetrafluoroethylene, polyethylene terephthalate, polybutadiene, polyvinylchloride, polyvinylidene-chloride, and cellulose acetate.

14. The method of claim 7 wherein said barrier layer is selected from the group consisting of metals, fibrillar webs impregnated with one or more polymer films, fibrillar webs coated with one or more polymer films, and fibrillar webs having adhesively attached thereto one or more polymer films.

15. The method of claim 1 wherein said at least one monomer comprises a $C_5$–$C_{30}$ α-olefin.

16. The method of claim 15 wherein said at least one monomer further comprises at least one $C_2$–$C_4$ 1-alkene.

17. The method of claim 16 wherein said at least one $C_2$–$C_4$ 1-alkene is added to said mixture after said mixture has been coated on said substrate.

18. The method of claim 17 wherein said at least one $C_2$–$C_4$ 1-alkene is provided by performing said method in an atmosphere comprising said at least one $C_2$–$C_4$ 1-alkene and allowing said at least one $C_2$–$C_4$ 1-alkene to diffuse into said mixture.

19. The method of claim 18 wherein said film produced by said in-line procedure exhibits graded or differential tack.

20. The method of claim 15 wherein said at least one monomer further comprises up to 10 mole percent of a non-conjugated polyene monomer.

21. The method of claim 15 wherein said catalyst system is a Ziegler-Natta or metallocene system.

22. The method of claim 1 wherein said at least one monomer comprises a ring-strained non-conjugated cyclic olefin.

23. The method of claim 22 wherein said mixture further comprises an antioxidant.

24. The method of claim 22 wherein said cyclic olefin is a monocyclic monoolefin, monocyclic polyolefin, a polycyclic monoolefin, or a polycyclic polyolefin.

25. The method of claim 22 wherein said catalyst system comprises a compound comprising at least one of Mo, W, Ru, Os, Ti, Re, and Ir.

26. The method of claim 25 further comprising a cocatalyst selected from the group consisting of Lewis acids, oxidizing agents, silanes, heteroatom-containing olefins, and alkynes.

27. The method of claim 1 wherein said mixture is essentially free of solvent.

28. The method of claim 1 wherein said mixture further comprises at least one adjuvant.

29. The method of claim 1 wherein the in-line procedure occurs in an environment capable of producing a high molecular weight poly(olefin).

30. A process for making a poly(olefin) film in an in-line procedure comprising the steps:

a) providing a substrate coated with a layer of a mixture comprising 1) at least one olefinic monomer, having 5 to 30 carbon atoms, having the formulae

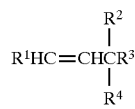

wherein $R^1$ is hydrogen and $R^2$, $R^3$, and $R^4$ are independently hydrogen or a $C_1$–$C_{27}$ aryl, aralkyl, aliphatic, or cycloaliphatic group, with the provisos that at least one of $R^2$, $R^3$, and $R^4$ must be hydrogen and that $R^2$, $R^3$, and $R^4$ cannot all be hydrogen, and 2) an effective amount of a Ziegler-Natta or metallocene catalyst system comprising a transition metal-containing species; and b) allowing said at least one monomer to polymerize to a poly(olefin) film, said method being performed in an environment that is inert toward said catalyst system.

* * * * *